(12) United States Patent
DeLuca et al.

(10) Patent No.: US 9,846,604 B2
(45) Date of Patent: Dec. 19, 2017

(54) ANALYZING DATA SOURCES FOR INACTIVE DATA

(71) Applicant: International Business Machines Corporation, Armonk, NY (US)

(72) Inventors: Lisa Seacat DeLuca, Baltimore, MD (US); Neal Fishman, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 14/541,964

(22) Filed: Nov. 14, 2014

(65) Prior Publication Data

US 2016/0142270 A1    May 19, 2016

(51) Int. Cl.
| | | |
|---|---|---|
| *G06F 15/173* | (2006.01) | |
| *G06F 9/54* | (2006.01) | |
| *G06F 17/30* | (2006.01) | |
| *H04L 12/26* | (2006.01) | |
| *H04L 29/08* | (2006.01) | |

(52) U.S. Cl.
CPC ........ *G06F 9/542* (2013.01); *G06F 17/30144* (2013.01); *H04L 43/04* (2013.01); *H04L 43/08* (2013.01); *H04L 67/22* (2013.01); *H04L 67/30* (2013.01)

(58) Field of Classification Search
None
See application file for complete search history.

(56) References Cited

U.S. PATENT DOCUMENTS

| | | |
|---|---|---|
| 7,502,891 B2 | 3/2009 | Shachor |
| 8,032,723 B2 | 10/2011 | Sechrest et al. |
| 8,090,754 B2 | 1/2012 | Schmidt et al. |
| 8,640,206 B2 | 1/2014 | Betsch et al. |
| 8,661,067 B2 | 2/2014 | Lehr et al. |

(Continued)

FOREIGN PATENT DOCUMENTS

CN    102200975 A    9/2011

OTHER PUBLICATIONS

List of IBM Patents or Patent Applications Treated as Related, May 6, 2015.

(Continued)

*Primary Examiner* — Hamza Algibhah
*Assistant Examiner* — Gregory P Tolchinsky
(74) *Attorney, Agent, or Firm* — Daniel R. Simek; Edell, Shapiro & Finnan, LLC (57) ABSTRACT

According to embodiments of the present invention, machines, systems, methods and computer program products for analyzing data sources for inactive data are presented. Data accesses within one or more data sources are monitored, and data access information is generated based on the monitored data accesses, wherein the data access information indicates accessed and non-accessed data within the one or more data sources. The data access information is applied to a profile to identify inactive data within the one or more data sources, wherein the profile includes one or more criteria for determining inactive data including a time interval for data access. Notifications of the identified inactive data within the one or more data sources are generated.

14 Claims, 5 Drawing Sheets

(56) References Cited

U.S. PATENT DOCUMENTS

| | | | |
|---|---|---|---|
| 2006/0143419 A1* | 6/2006 | Tulyani | G06F 3/061 |
| | | | 711/165 |
| 2006/0206507 A1* | 9/2006 | Dahbour | G06F 17/30604 |
| 2008/0010277 A1* | 1/2008 | Caruso | G06F 17/30864 |
| 2010/0257312 A1 | 10/2010 | Twigg | |
| 2011/0055559 A1* | 3/2011 | Li | G06F 21/6218 |
| | | | 713/165 |
| 2012/0212850 A1* | 8/2012 | Haustein | G11B 27/11 |
| | | | 360/39 |
| 2014/0019498 A1* | 1/2014 | Cidon | G06F 17/3007 |
| | | | 707/827 |

OTHER PUBLICATIONS

Green, "Enterprise Dark Data Is a Hidden Asset", Database and Network Journal, ISSN 0265-4490, Dec. 1, 2013, 2 pages.
Goetz, "Freeing the Dark Data of Failed Scientific Experiments", Wired Magazine: Issue 15.10, accessed at www.wired.com/science/discoveries/magazine/15-10/st_essay, Sep. 25, 2007, 2 pages.
McCormick, "Dark Data: B2B's Big Data Challenge", Oct. 23, 2013, 2 pages.
Chin, "Working With Organizational Dark Data", Intranet Journal, Jul. 7, 2005, 2 pages.
Green, "Enterprise Dark Data Is a Hidden Asset", Technical Support Magazine, Feb. 2014, vol. 6, No. 2, p. 4-5.

\* cited by examiner

ANALYZING DATA SOURCES FOR INACTIVE DATA

BACKGROUND

1. Technical Field

Present invention embodiments relate to analyzing data sources for inactive data, and more specifically, to analyzing data sources by applying information from a profile to identify inactive data within those data sources.

2. Discussion of the Related Art

Organizations have traditionally grappled with how much data to store largely due to the overall cost of storage devices. For example, many organizations historically were storing less than one terabyte of data, with the physical amount of stored data effectively limited by the cost of storage.

In contrast, since data storage has become relatively inexpensive and is fully complemented by a seemingly inexhaustible supply of data as a resource, organizations are less concerned about over-preservation of data. For example, a terabyte of disk space may currently be purchased for a fraction of its former cost. Accordingly, organizations are now actively storing hundreds of terabytes, and in some cases petabytes or exabytes, of data.

Data is generally recognized by corporate personnel as a strategic resource from which competitive advantages can be attained. Accordingly, organizations are entering a mode of collecting and storing all corporate data, without regard to derived business value.

Currently, identifying data that is not actively consumed by an organization is largely based upon a "feeling" from various corporate personnel, or may be based upon input from an Information Technology (IT) department that evaluates gross data consumption based upon general portfolios of supported software. Such subjective methods are not reliable and may not identify key documents or key data that could be leveraged, as well as may be subject to user bias, e.g., bias from a user role in an organization.

SUMMARY

According to embodiments of the present invention, machines, systems, methods and computer program products for analyzing data sources for inactive data are presented. Data accesses within one or more data sources are monitored, and data access information is generated based on the monitored data accesses, wherein the data access information indicates accessed and non-accessed data within the one or more data sources. The data access information is applied to a profile to identify inactive data within the one or more data sources, wherein the profile includes one or more criteria for determining inactive data including a time interval for data access. Notifications of the identified inactive data within the one or more data sources are generated.

These and other aspects, features and embodiments of the present invention will be understood with reference to the drawing figures and the detailed description herein, and will be realized by way of the various elements and combinations particularly pointed out in the appended claims. It is to be understood that both the foregoing general description and the following brief description of the drawings and detailed description are examples and are explanatory of preferred embodiments of the invention, and are not restrictive of present invention embodiments, as claimed.

BRIEF DESCRIPTION OF THE SEVERAL VIEWS OF THE DRAWINGS

Generally, like reference numerals in the various figures are utilized to designate like components.

DETAILED DESCRIPTION

The volume of stored data (active and inactive) is substantial and difficult to manage for many organizations. Active or accessed data refers to information that is utilized by an individual or organization regarding ongoing business or other operations. Data that is collected and stored as part of normal business or other activities, but is otherwise not generally utilized by an application (e.g., software), group, or an individual, and is not being used for business or other purposes (e.g., analytics, business processes, etc.) is referred to as inactive or "dark data". Dark data may also be referred to as idle data or unused data. Most corporations and businesses retain large volumes of data, including dark data, due to lack of general quantified utilization methods for inactive stored data.

Dark data may apply to any type of data, e.g., structured data, semi-structured data, or unstructured data. Dark data may also refer to data that persists in a type of storage unit, e.g., a formal database or a commercial or open-source repository.

Certain data, over time, may become idle (dark) for a variety of reasons. For example, users of data may access subsets of data for which they are familiar, comfortable, and confident in pursuing, thereby resulting in other data becoming isolated or eventually becoming inactive. In other examples, users may pursue a subset of data because the corresponding superset of data is overwhelming in size. Other reasons for data becoming inactive include factors such as data awareness, trust of a data source, accessibility of information, and perceived value of data.

The need for organizations to address and utilize dark data in the present era is no longer centered on the expense of managing large volumes of data, but instead, is centered on a need to ensure that the value of the corporate data asset is realized to the fullest extent possible. Additionally, organizations may also need to consider how long such data should be stored, and may need to determine business relevance of various data domains when determining how long to retain information. Questions may be asked, such as: Should data about a former customer be stored and for how long? What is the relevance of such data to current business operations?

Present invention embodiments allow for identification and meaningful use and/or reuse of stored data to identify inactive or dark data in order to more fully leverage data as a corporate or organizational asset. For example, identifying exactly which data has gone inactive allows an organization to harvest dark data for patterns or other traits that may valuably contribute to corporate or organizational decision-making or for deriving other business insight. For example, the quality of statistical analysis often relies on the number of data points present in a calculation. Accordingly, the identification of dark data can introduce additional data points that may not otherwise be identified for inclusion in a statistical analysis, to strengthen the statistical analysis. In other examples, the use of dark data could serve to improve customer support, or in a government agency setting, to better serve the citizen(s).

Present invention embodiments also may integrate with existing data security solutions, e.g., such as Guardium's Data Activity Monitor (DAM).

Figure 1:
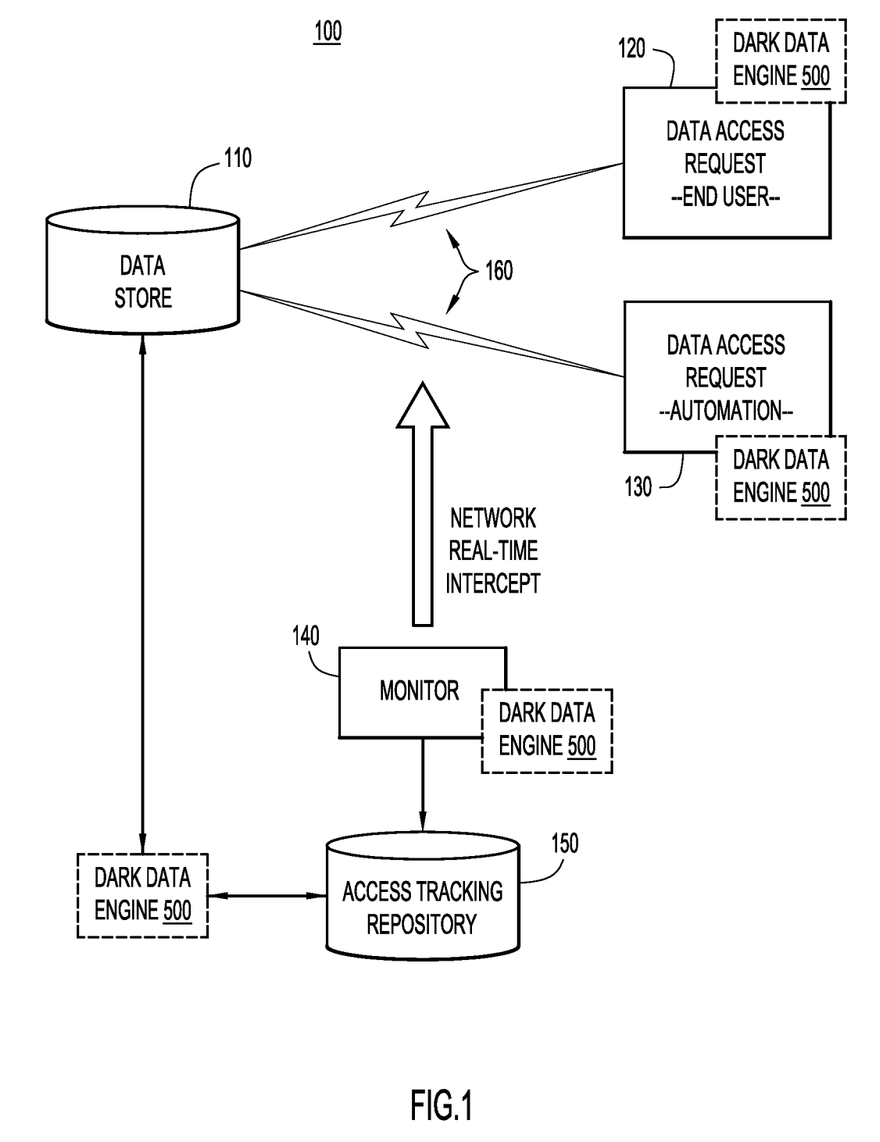
FIG. 1 is an illustration showing an example of monitoring data access requests across an enterprise network in accordance with an embodiment of the present invention.

FIG. 1 shows an illustration of an example of monitoring data access requests across an enterprise network to identify dark data in accordance with present invention embodiments. Specifically, the environment 100 includes one or more data stores 110, one or more client or end-user systems 120, one or more server systems 130, a monitoring unit 140, an access tracking repository 150, a network 160, and a dark data engine 500. A dark data engine 500 (see, FIG. 5) is also shown, and may reside on a client or end-user system 120, a server system 130, on a monitoring unit 140, or may reside on a stand-alone system or any system with a network interface that is in communication with data store 110 and access tracking repository 150. In some embodiments, dark data engine 500 may contain monitoring functionality, while in other embodiments, dark data engine may integrate with existing security software or data governance software, which may employ monitor unit 140 having monitoring functionality.

Present invention embodiments include monitoring and logging data access requests, e.g., automated data access requests by one or more servers during normal operations as well as data access requests by an end-user, in real time by intercepting communications between data store 110 and the one or more client devices 120 or one or more servers 130 generating data access requests. Monitoring unit 140 may be used to detect such communications between data store 110 and systems 120 and servers 130. A list, log, or other equivalent detailing data that is accessed by automated or user-driven processes may be stored in access tracking repository 150.

Client systems 120 and server systems 130 may be remote from each other and communicate over a network 160. The network may be implemented by any number of any suitable communications media (e.g., wide area network (WAN), local area network (LAN), Internet, Intranet, etc.). Alternatively, client systems 120 and server systems 130 may be local to each other, and communicate via any appropriate local communication medium (e.g., local area network (LAN), hardwire, wireless link, Intranet, etc.).

Monitoring system 140 may monitor communications between data store 110 and client and server systems 120 and 130, regardless of whether the server systems and client systems are local to or remote from each other.

Client systems 120 enable users to request information (e.g., documents for document collections, documents for analysis, etc.) for an end-user. The server systems 130 enable applications running on the respective servers to request access to specified data as part of automated processes.

Data store 110 may store various information (e.g., data pertaining to ongoing business processes, etc.). The data store may be implemented by any conventional or other database or storage unit, may be local to or remote from client systems 120 and server systems 130, and may communicate via any appropriate communication medium (e.g., local area network (LAN), wide area network (WAN), Internet, hardwire, wireless link, Intranet, etc.).

The client systems 120 may present a graphical user (e.g., GUI, etc.) or other interface (e.g., command line prompts, menu screens, etc.) to solicit information from users pertaining to the desired documents and analysis, and may provide information requested by an end-point user (e.g., financial records, human resource records, regulatory compliance records, etc.) as part of ongoing business operations.

By intercepting communications from client servers 120 and server systems 130 to data store 110 to determine which data is being accessed, analysis of data access information stored in access tracking repository 150 may be performed to identify inactive or dark data. Present invention embodiments capture and log activity for data augmentation, e.g., insert/add activity, update/change activity, and delete/removal activity, etc. as well as for read-only, automated or general access activity.

Monitoring system 140 may intercept a read request by trapping a request to access data from a data store 110 and subsequently logging the event. The logged event may record one or more types of information associated with characterizing the requested data, including, e.g., which data was accessed, which client system or server system made the request, end-user or associated characteristics of an end-user that made the request, file names, database fields, time of access, number of times data has been accessed, etc.

Figure 2:
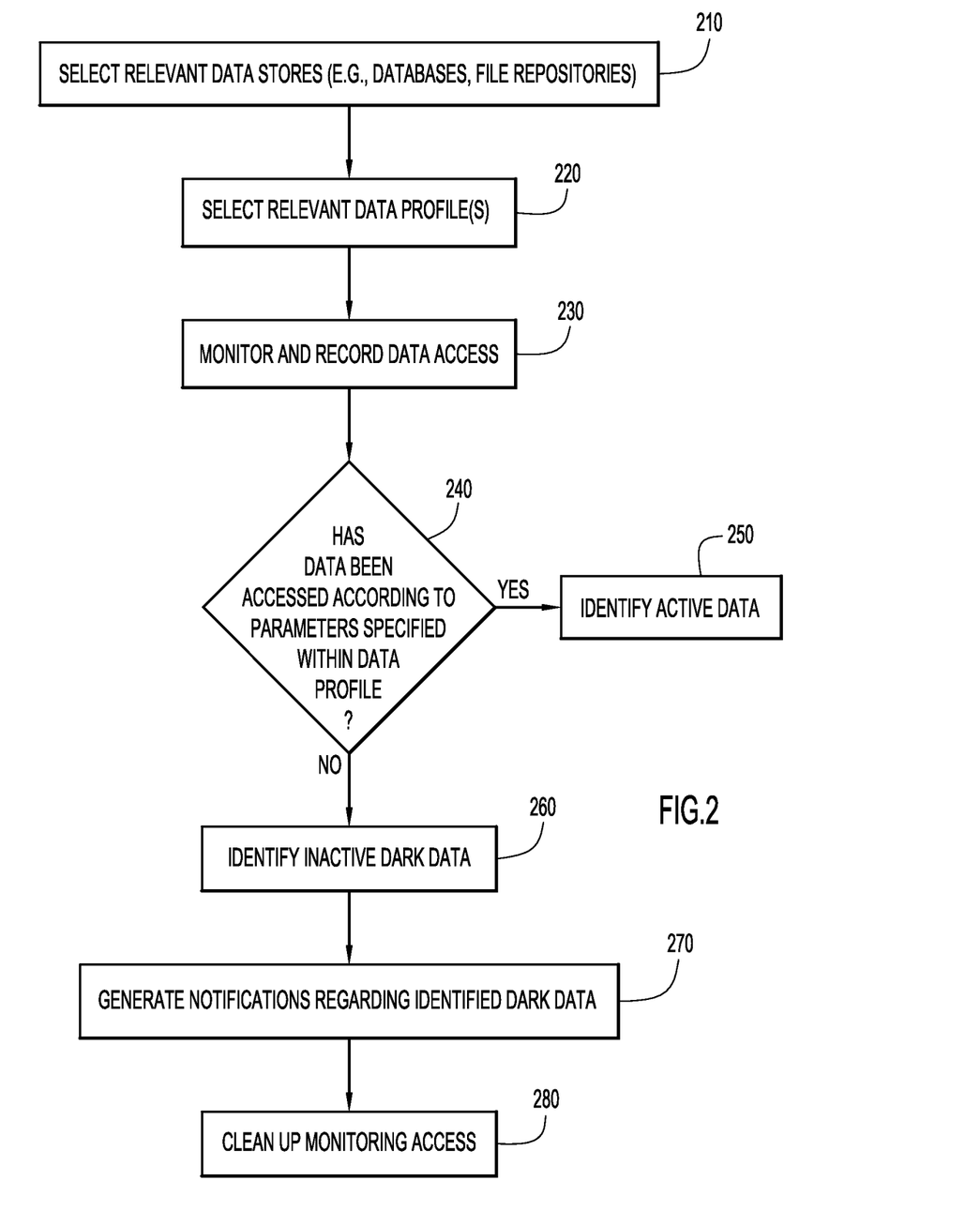
FIG. 2 is an example of a procedural flowchart showing identification of inactive data in accordance with an embodiment of the present invention.

An example flow diagram for identifying dark data is shown in FIG. 2. Generally, the set of all values within a data store excluding the set of values within the same data store that have been accessed represents dark data. Dark data may be interleaved, at least temporally, with accessed data.

Each database or data repository, e.g., data store 110, is generally an identifiable or discoverable asset. Once it has been established which data of a set of data has been accessed, it may then be determined which data has not been read or consumed. By identifying data that has been read by a person or process, for a specified period of time, data that has not been consumed can be derived and identified as dark data.

Generally, the summary of accessed data stored in access tracking repository 150 is a log or record of which columns and rows are accessed for structured and semi-structured datasets, e.g., databases, etc., and which files are accessed for unstructured datasets, e.g., file repositories. The remaining data in the dataset, data that has not been accessed, may be identified as idle or dark data.

Referring again to FIG. 2, at operation 210, relevant data stores are selected and targeted for monitoring. Data stores may be explicitly included or implicitly included, e.g., when discoverable. An example of explicitly including a data store is to name the particular data store to be included. To implicitly include a data store is to identify the data store through generalization, such as any data store within a data center or any data store on a cluster of machines. In some embodiments, selected data stores may include all data stores that a particular user, group, application or other entity has access to.

At operation 220, relevant data profiles are selected. Data profiles may specify parameters that are used to determine whether data is classified as dark data. Data profiles may include: (1) one or more time parameters, (2) one or more user parameters, and (3) one or more filters. Present invention embodiments support defining and applying multiple and concurrent profiles to define dark data.

In some embodiments, time parameters include a time range or time period from which it is determined whether specified data has been accessed within that time range. A time range may be specified for all datasets or for specific datasets, with a dataset being a generalized term for any database or repository that is monitored for dark data. For example, the time range may include a start date and an end date corresponding to a past period of time. As another example, the time range may include a start date corresponding to a past period of time up through and including the current date and time. Data not accessed within a given time frame may be determined to be dark data. A period of time may be defined in terms of seconds, days, months, quarters, years, etc. or from the current date and time. Additionally, present invention embodiments permit a previously specified time period to be modified for identifying dark data. In other embodiments, distinct time ranges may be applied to different subsets of a dataset.

In other embodiments, a time frame may be specified, and an evaluation may be performed to determine whether data has been accessed outside (e.g., before or after) a given time frame. Accordingly, present invention embodiments permit exclusion of a context, e.g., whether a context of time, a context of a user/audience, or any other context of a parameter, for asserting whether or not data constitutes dark data.

In still other embodiments, parameters include a frequency of access, in which it is determined how many times specific data has been accessed within a given time range, e.g., fewer times than expected, etc., to determine if data is dark data.

Parameters such as expected frequency of access, time periods, access characteristics relative to a group or individual, etc., may be established by an organization and may vary for different categories of data.

Profiles may also specify degrees of dark data, based upon a contextual meaning in regard to an audience or user profile, permitting a context to be established for an identified audience in terms of the role played within an organization. The audience may be, e.g., an individual/person, a team, a department, an organization, the enterprise itself (boundaries for an enterprise can vary), a computer application, a procedure, a process, etc.

Profiles may be established for each audience. For example, data may be considered to be dark data relative to an individual's use of data. Data may be considered to be dark data relative to a group's use of data. A group may be, e.g., a team, a department, an organization, or an enterprise, etc. Data may also be considered to be dark relative to an application program, procedure, or process. For example, an individual's work may or may not be part of a workflow within a group. If an individual's data-based work products (e.g., decisions or actions) are not formally part of a workflow, the group's quantified use of data may still be regarded as dark even though the individual, as a member of the group, is actively using the data. Additionally, if an individual has left the group, any active use of data by the individual may be removed from the group's determined use of data.

Figure 3:
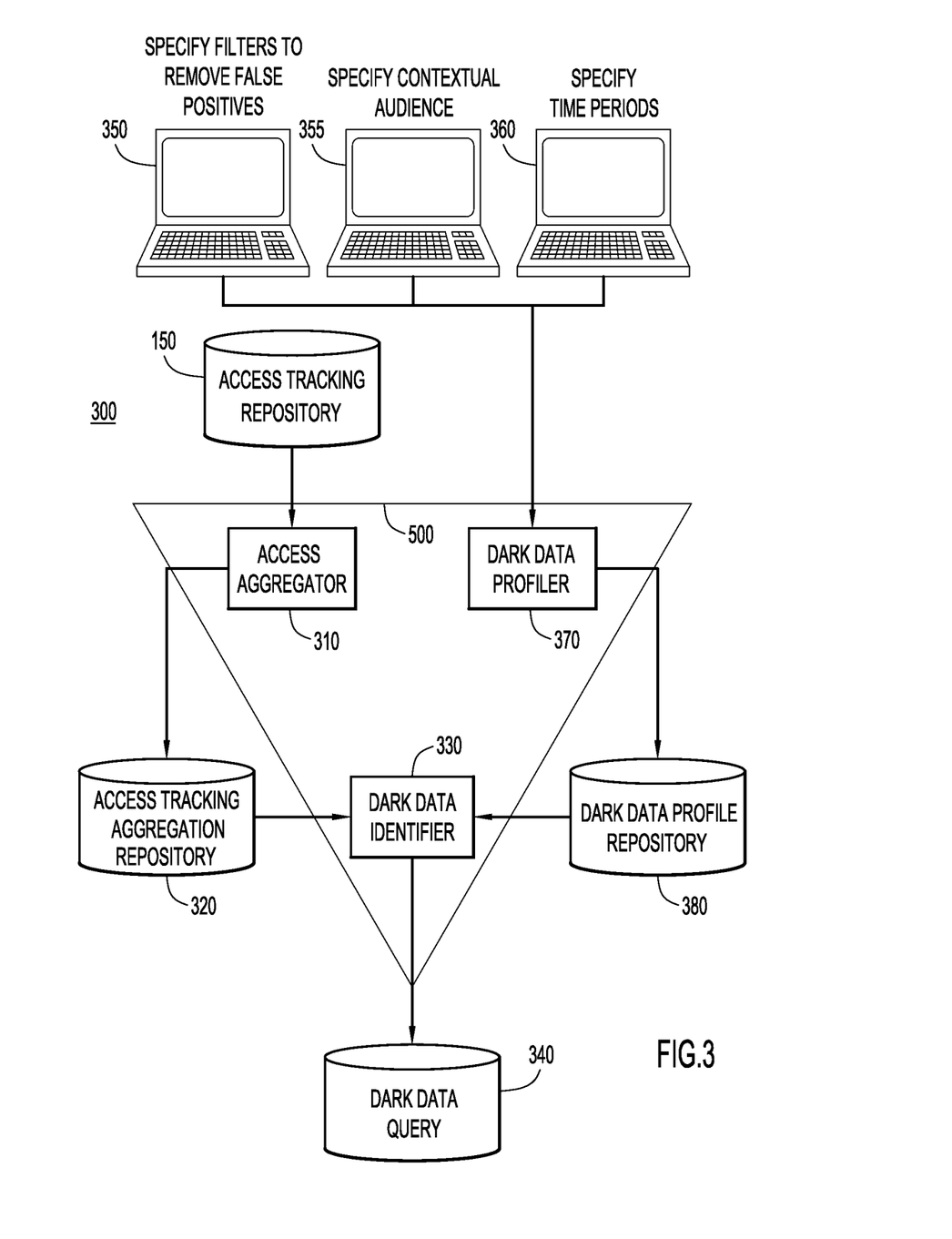
FIG. 3 is an illustration showing an example of an inactive data identification engine across an enterprise network in accordance with an embodiment of the present invention.

In other embodiments, one or more of the monitored data accesses within the data access information may be masked or filtered so as not to produce false positives. Filtering may occur as part of the clean-up process at operation 280, as part of constructing dark data profiles at operations 350 and/or 370, or any combination thereof. For example, if the dark data engine were to read the available data in a dataset so as to ascertain the amount and type of dark data, then by virtue of reading the data (accessing the data), the data is no longer considered to be dark. Therefore, in this case, it is necessary to filter out data accesses by the dark data engine from the results (identified dark data) so as not to create false positives.

At operation 230, data access is monitored and recorded. Monitoring is generally performed in real time, and encompasses automatic access, e.g., application access, automated access, etc., as well as access from an end-user via a client system. At operation 240, the access log, e.g., access tracking repository 150, is evaluated to determine whether data has been accessed according to the parameters specified within one or more data profiles. Based upon the results of the evaluation, data that has been accessed is identified as active data at operation 250, and data that has not been accessed is identified as inactive or dark data at operation 260.

At operation 270, data may be formally identified as dark data by generating notifications regarding the identified dark data. For example, notifications can be based on a subscription for an explicitly or implicitly identified data store and may alert an individual or group that a specific set of data has reached a threshold for being considered dark. The notification may inform the subscriber that the newly turned dark data represents an untapped and valuable information resource, e.g., for statistical analysis.

At operation 280, clean up of monitoring by the dark data analysis engine may occur. For example, if the dark data analysis engine were to access data for the sole purpose of determining its value to the dark data set, read activity on this dark data may create false positives and lead to this data being classified as active data. Accordingly, the system may remove any trace of such access so as not to affect future dark data analyses, ensuring that dark data remains classified as dark data and is not affected by multiple rounds of read activity by the dark data analysis engine. The dark data analysis engine may also be used to determine how many times the same dark data has been reviewed and analyzed to ascertain business value. Further, users may experiment with establishing dark data profiles, e.g., essentially, optimizing or changing profiles over time, without appearing to have used or read the data unnecessarily. As mentioned previously, filtering may occur as part of the clean-up process at operation 280, as part of constructing dark data profiles at operations 350 and/or 370, or any combination thereof.

An example of pseudo-code is provided for deriving dark data from a set of data. In this example, a file named "accessed_data" would contain the summary of all data accessed while the file named "database" is the file containing dark data:

```
select * {count, primary/candidate keys, data values, etc.}
    from database a
  where a.given_record not in
      (select *
         from accessed_data b
       where a.given_record = b.given_record)
```

The example pseudo-code is designed to isolate data from a database in which a particular record, row, or file does not have an accompanying or inferred accompanying entry in the accessed_data file. An accompanying entry includes entries that were captured by a monitor, e.g., a particular record that was explicitly accessed. An inferred accompanying entry includes entries that were interpolated or extrapolated from a specified predicate, wherein criteria in the data request is recorded by the monitor.

Referring to FIG. 3, an illustration of a system level view 300 is shown depicting the dark data engine 500, which performs operations 310, 330 and 370, and stores corresponding results of operations in various repositories. Dark data engine 500 may aggregate data access information at operation 310, may aggregate profiles at 370, as well as utilize one or more profiles to analyze data to identify dark data at operation 330 (see FIG. 5). Information from monitoring data access (see, FIG. 1) may be stored in access tracking repository 150. At operation 310, an access aggregator combines the results of monitoring to generate groups of accessed data. For example, groups may include all files accessed in a data repository, in a folder or subfolder of a data repository, etc. The results of the aggregation are stored in access tracking aggregation repository 320. One or more aggregation results are provided to a dark data engine at operation 330. The dark data engine 500 may analyze data to determine which data is dark data in regards to specified profiles. The results of dark data identification are stored in dark data query repository 340.

At operation 330, the dark data engine 500 may also receive input corresponding to one or more profiles. At operation 370, profile information may be specified by one or more sources of information 350, 355 and 360. Specified information may include one or more filters 350 to remove false positives, one or more contextual audiences 355, and one or more time periods 360. Profiles, both individual and aggregate, may be stored in dark data profile repository 380. Accordingly, profile information stored in dark data profile repository 380 combined with access logging information stored in access tracking aggregation repository 320 may be fed into the dark data engine 500 to analyze data and identify dark data at operation 330, based on profile and access information.

Figure 4:
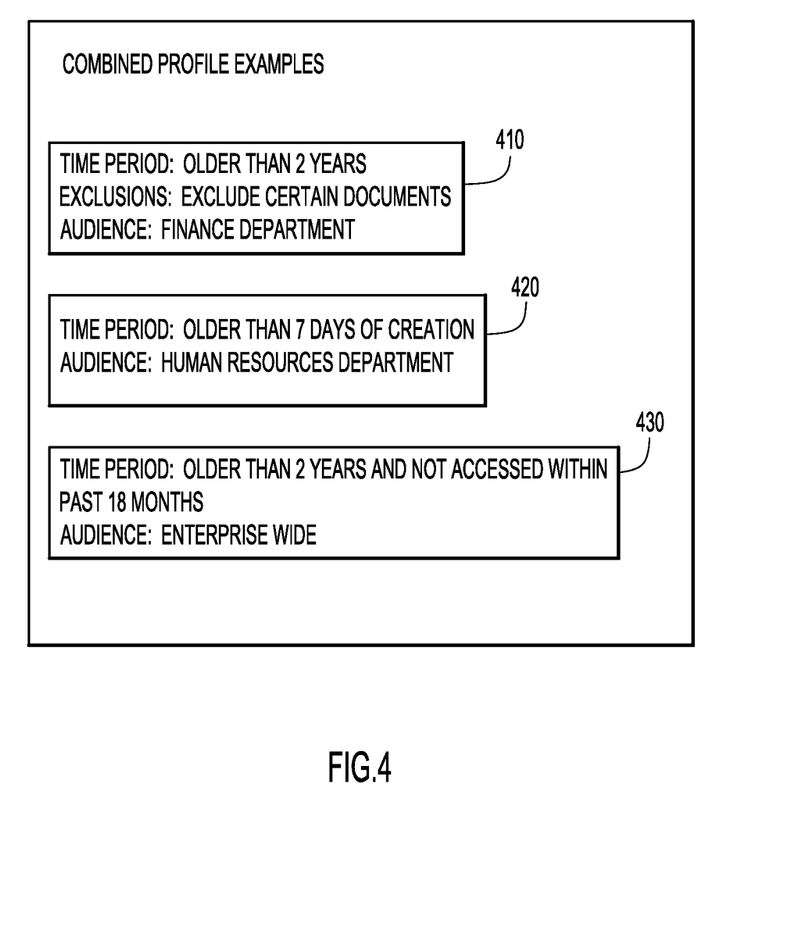
FIG. 4 shows examples of profiles according to embodiments of the present invention.

Referring to FIG. 4, examples are provided of combined profiles. In the upper example 410, dark data has been generally defined as data that has not been accessed within the past two years. Given that regulatory requirements may necessitate data storage for longer periods of time, an exclusion may be implemented, which excludes certain documents associated with financial filings. These documents will not be identified as dark data, as these documents will provide business value to the company for at least as long as the length of time required to preserve the documents.

In the middle example 420, a profile may be set up to include new Human Resource (HR) personnel in a particular dataset that has not been accessed during the first seven days of its creation by any employee within the HR department. In some embodiments, this profile may be modified to include data that was accessed a defined number of times, i.e., just once.

Likewise, in the lower example 430, an organization may define one profile of dark data as any data that is more than two years old and has not been accessed within the last 18 months. If the data is grouped into different categories, e.g., year-1, year-2, year-3, year-4, and year-5, and provided that years 3 and 5 have not been accessed for over two years and year-4 was accessed last week, the subset of dark data within this sample set would be year-3 and year-5 data.

Figure 5:
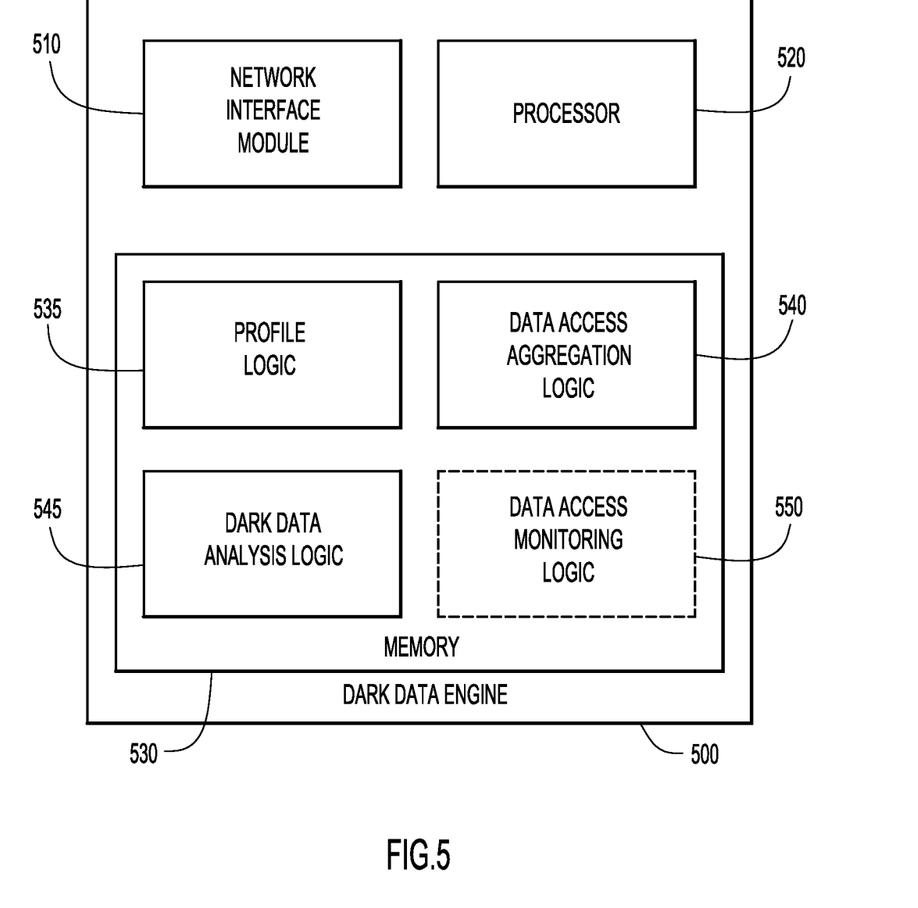
FIG. 5 is a block diagram of an apparatus for identifying inactive data in accordance with an embodiment of the present invention.

FIG. 5 illustrates an example block diagram of a dark data engine 500, configured to perform the techniques presented herein. The engine may include a network interface unit 510, a processor 520, and a memory 530. The network interface unit 510 is configured to receive and send data over a network. Network interface unit 510 and processor 520 are only needed for stand-alone units, otherwise network interface units and processors of client systems or servers are utilized.

The processor 520 may be embodied by one or more microprocessors or microcontrollers, and executes software instructions stored in memory 530 for profile logic 535, data access aggregation logic 540, dark data analysis logic 545, and data access monitoring logic 550, as shown in FIGS. 1-4. Dark data engine 500 may operate as a stand-alone unit in communication with data store 110 and access tracking repository 150, be integrated with a client server 120, be integrated with a server 130, or be part of a monitoring unit 140. In other embodiments, dark data engine 500 may be integrated with any data security or data governance application.

Profile logic 535 may utilize one or more profiles and may aggregate profiles, as shown at operation 370, used to analyze data to determine which data is dark data. Profile information may include any information used to characterize data access, e.g., time/frequency parameters, user/audience parameters, and filters. Data Access Aggregation Logic 540 may be used to aggregate records of data access and store such aggregated data records, as shown at operation 310, in Access Tracking Aggregation Repository 320 (see, FIG. 3). Dark Data Analysis Logic 545 may utilize profile information to determine which data is dark data, based upon data access information, as shown at operation 330. Data Access Monitoring Logic 550 may be used to monitor data requests (see, FIG. 1, monitoring unit 140) from a client system 120 or server 130.

Advantages of present invention embodiments include but are not limited to: (1) integrating with existing software to extend capabilities by directly analyzing data to identify dark data; (2) providing insight and analysis into an organization's stored data to help ensure that stored data continues to drive business value propositions and needs, e.g., by actively re-harvesting data and avoiding data from going unnecessarily stale; (3) providing general analytics of dark data; and (4) providing support for a dark data cloud offering in which the cloud offering may aggregate dark data over multiple cloud implementations.

Server systems 130 and client systems 120 may be implemented by any conventional or other computer systems preferably equipped with a display or monitor, a base (e.g., including at least one processor 520, one or more memories 530 and/or internal or external network interfaces or communications devices 510 (e.g., modem, network cards, etc.)), optional input devices (e.g., a keyboard, mouse or other input device), and any commercially available and custom software (e.g., server/communications software, module, browser/interface software, etc.).

Alternatively, one or more client systems 120 may request information related to business or other processes when operating as a stand-alone unit. In a stand-alone mode of operation, the client system stores or has access to the data (e.g., data generated by a corporation, individuals associated with a corporation, applications, processes, etc.), and includes modules to aggregate profile information and data access information to analyze data to identify inactive data. In some embodiments, a monitoring module may be included as well. The graphical user (e.g., GUI, etc.) or other interface (e.g., command line prompts, menu screens, etc.) solicits information from a corresponding user pertaining to the desired documents and analysis, and may provide reports including analysis results.

Modules may include one or more modules or units to perform the various functions of present invention embodiments described below. The various modules (e.g., profile module 535, data access aggregation module 540, dark data analysis module 545, and (optional) data access monitoring module 550, etc.) may be implemented by any combination of any quantity of software and/or hardware modules or units, and may reside within memory 530 of the server and/or client systems for execution by processor 520.

It will be appreciated that the embodiments described above and illustrated in the drawings represent only a few of the many ways of implementing embodiments for analyzing data resources for dark data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., profile logic 535, data access aggregation logic 540, dark data analysis logic 545, and (optionally) data access monitoring logic 550) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., profile logic 535, data access aggregation logic 540, dark data analysis logic 545, and (optional) data access monitoring logic 550) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., corporate information stored on a data store, data access information, profile information, dark data information, etc.). The database system may be implemented by any number of any conventional or other databases, data stores or storage structures (e.g., files, databases, data structures, data or other repositories, etc.) to store information (e.g., corporate information stored on a data store, data access information, profile information, dark data information, etc.). The database system may be included within or coupled to the server and/or client systems. The database systems and/or storage structures may be remote from or local to the computer or other processing systems, and may store any desired data (e.g., corporate information stored on a data store, data access information, profile information, dark data information, etc.).

The present invention embodiments may employ any number of any type of user interface (e.g., Graphical User Interface (GUI), command-line, prompt, etc.) for obtaining or providing information (e.g., corporate information stored on a data store, data access information, profile information, dark data information, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., dark data, active data, data associated with data access requests, etc.).

The present invention embodiments are not limited to the specific tasks or algorithms described above, but may be utilized for processes, in general, involving the analysis of data. Profiles, data sources, and other parameters are not limited to the specific types of information described above but may include any type of information for characterizing patterns of data access. Dark data analysis may utilize information from one or more profiles (including one or more audience contexts), one or more data sources, or any other information used to characterize patterns of data access in order to identify dark data. For example, usernames, organization roles, Client and Server Internet Protocol Addresses, Client and Server Media Access Control addresses, any associations between users and services, server or client names, database field or object names, database query strings, etc., may be logged as part of the monitoring process to provide information about patterns of data access. Profiles may be any format, may include any type or quantity of parameters, any type or quantity of conditions, as well as be applied to any of one or more sources comprising any type of data and data rows (e.g., structured, semi-structured, or unstructured data). In some embodiments, present invention embodiments may be used to analyze data that is highly utilized in addition to determining dark data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functionslacts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for analyzing data sources for inactive data comprising:
one or more memories; and
at least one processor coupled to the one or more memories and configured to:
intercept data access requests in real time and monitor data accesses within one or more data sources, wherein the monitored data accesses include at least one monitored data access used for determining inactive data;
generate data access information based on the monitored data accesses, wherein the data access information indicates accessed and non-accessed data within the one or more data sources;
filter the monitored data accesses and remove from the data access information the at least one monitored data access used for determining inactive data to avoid creating a false indication of active data;
apply the data access information to a profile to identify inactive data within the one or more data sources, wherein the profile includes one or more criteria for determining inactive data; and
generate notifications of the identified inactive data within the one or more data sources.

2. The system of claim 1, wherein applying the data access information to a profile further includes:
identifying data of the one or more data sources as inactive in response to the data not being accessed relative to a time interval for data access.

3. The system of claim 1, wherein the one or more criteria of the profile include a frequency of access, and applying the data access information to a profile further includes:
identifying data of the one or more data sources as inactive in response to a quantity of accesses for the data within a time interval being less than the frequency of access.

4. The system of claim 1, wherein applying the data access information to a profile further includes:
selecting at least one data source from the one or more data sources to analyze for inactive data; and
applying the data access information pertaining to the at least one selected data source to the profile to identify inactive data within the at least one selected data source.

5. The system of claim 1, wherein applying the data access information to a profile further includes:
masking the at least one monitored data access used for determining inactive data within the data access information; and
applying the data access information with unmasked data accesses to the profile to identify inactive data within the one or more data sources.

6. The system of claim 1, wherein applying the data access information to a profile further includes:
selecting one or more contexts to analyze for inactive data; and
applying the data access information pertaining to the selected one or more contexts to the profile to identify inactive data of the one or more data sources within each of the selected contexts.

7. The system of claim 6, wherein the selected one or more contexts include one or more from a group of: data access by a particular user, data access by a particular group of users, and data access by a particular application.

8. A computer program product for analyzing data sources for inactive data comprising a computer readable storage medium having computer readable program code embodied therewith, the computer readable program code, when executed by a processor, causes the processor to:
intercept data access requests in real time and monitor data accesses within one or more data sources, wherein the monitored data accesses include at least one monitored data access used for determining inactive data;
generate data access information based on the monitored data accesses, wherein the data access information indicates accessed and non-accessed data within the one or more data sources;
filter the monitored data accesses and remove from the data access information the at least one monitored data access used for determining inactive data to avoid creating a false indication of active data;
apply the data access information to a profile to identify inactive data within the one or more data sources, wherein the profile includes one or more criteria for determining inactive data; and
generate notifications of the identified inactive data within the one or more data sources.

9. The computer program product of claim 8, wherein the computer readable program code for applying the data access information to a profile is configured to cause the processor to:
 identify data of the one or more data sources as inactive in response to the data not being accessed relative to a time interval for data access.

10. The computer program product of claim 8, wherein the computer readable program code for applying the data access information to a profile is configured to cause the processor to:
 identify data of the one or more data sources as inactive in response to a quantity of accesses for the data within a time interval being less than a frequency of access, wherein the frequency of access is included in the one or more criteria of the profile.

11. The computer program product of claim 8, wherein the computer readable program code for applying the data access information to a profile is configured to cause the processor to:
 select at least one data source from the one or more data sources to analyze for inactive data; and
 apply the data access information pertaining to the at least one selected data source to the profile to identify inactive data within the at least one selected data source.

12. The computer program product of claim 8, wherein the computer readable program code for applying the data access information to a profile is configured to cause the processor to:
 mask the at least one monitored data access used for determining inactive data within the data access information; and
 apply the data access information with unmasked data accesses to the profile to identify inactive data within the one or more data sources.

13. The computer program product of claim 8, wherein the computer readable program code for applying the data access information to a profile is configured to cause the processor to:
 select one or more contexts to analyze for inactive data; and
 apply the data access information pertaining to the selected one or more contexts to the profile to identify inactive data of the one or more data sources within each of the selected contexts.

14. The computer program product of claim 13, wherein the selected one or more contexts include one or more from a group of: data access by a particular user, data access by a particular group of users, and data access by a particular application.

\* \* \* \* \*